Figure 1:
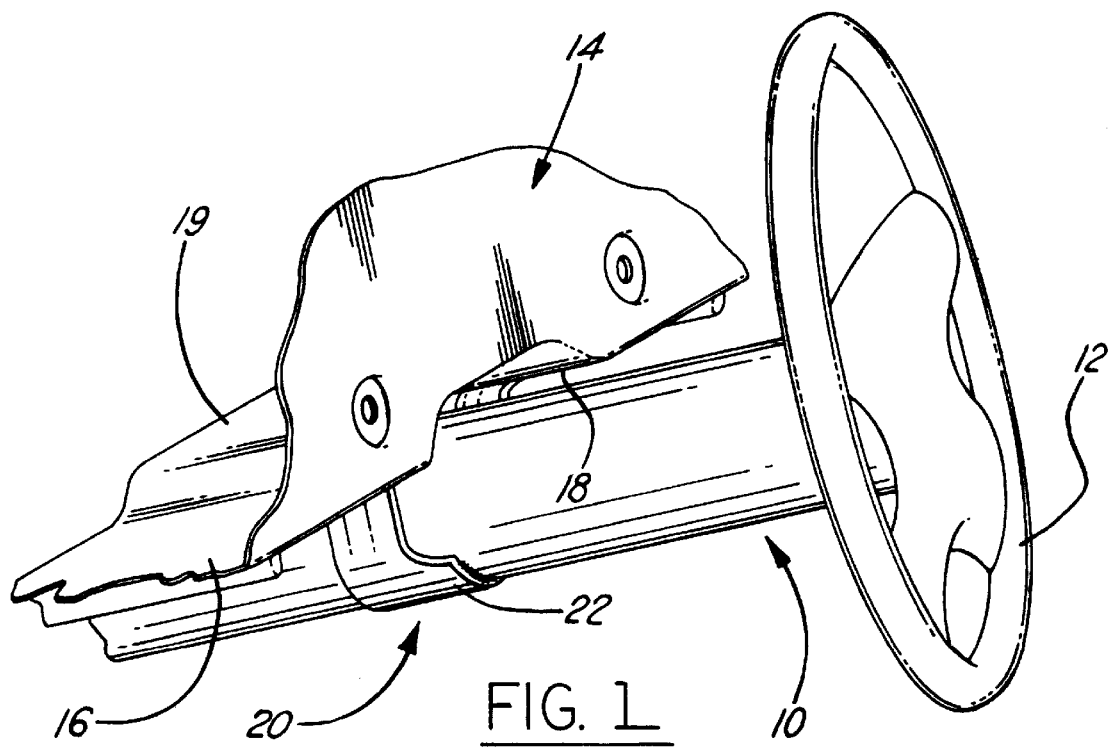
Figure 2:
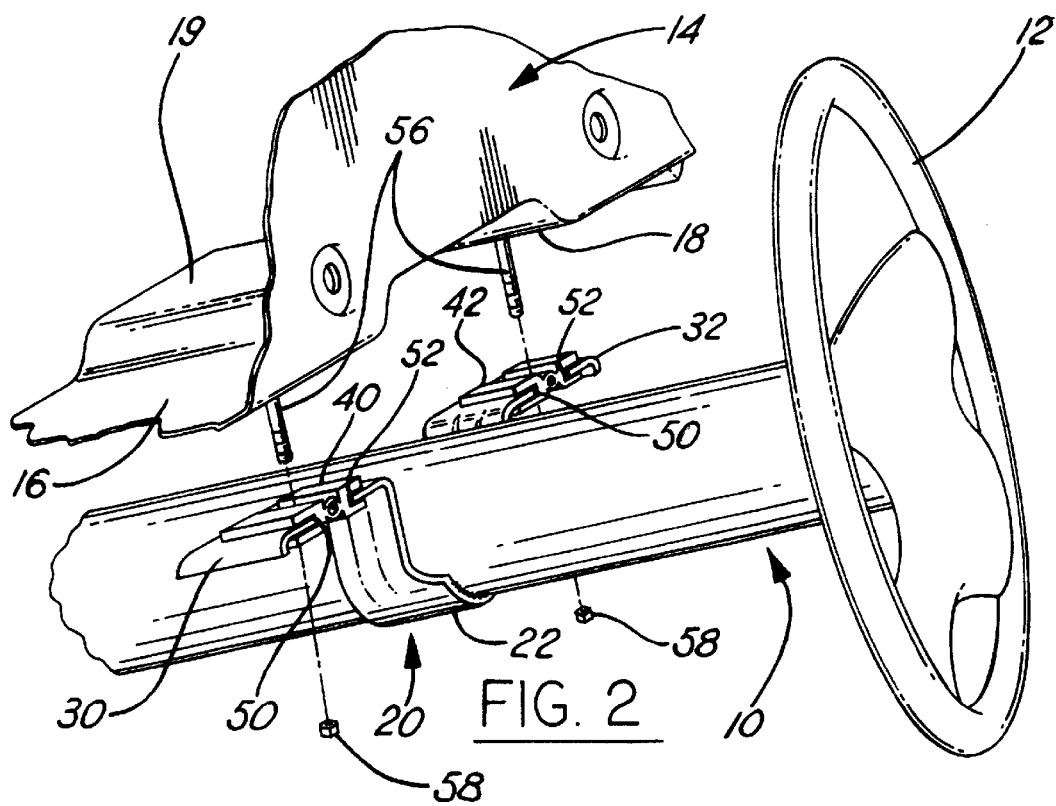
Figure 6:
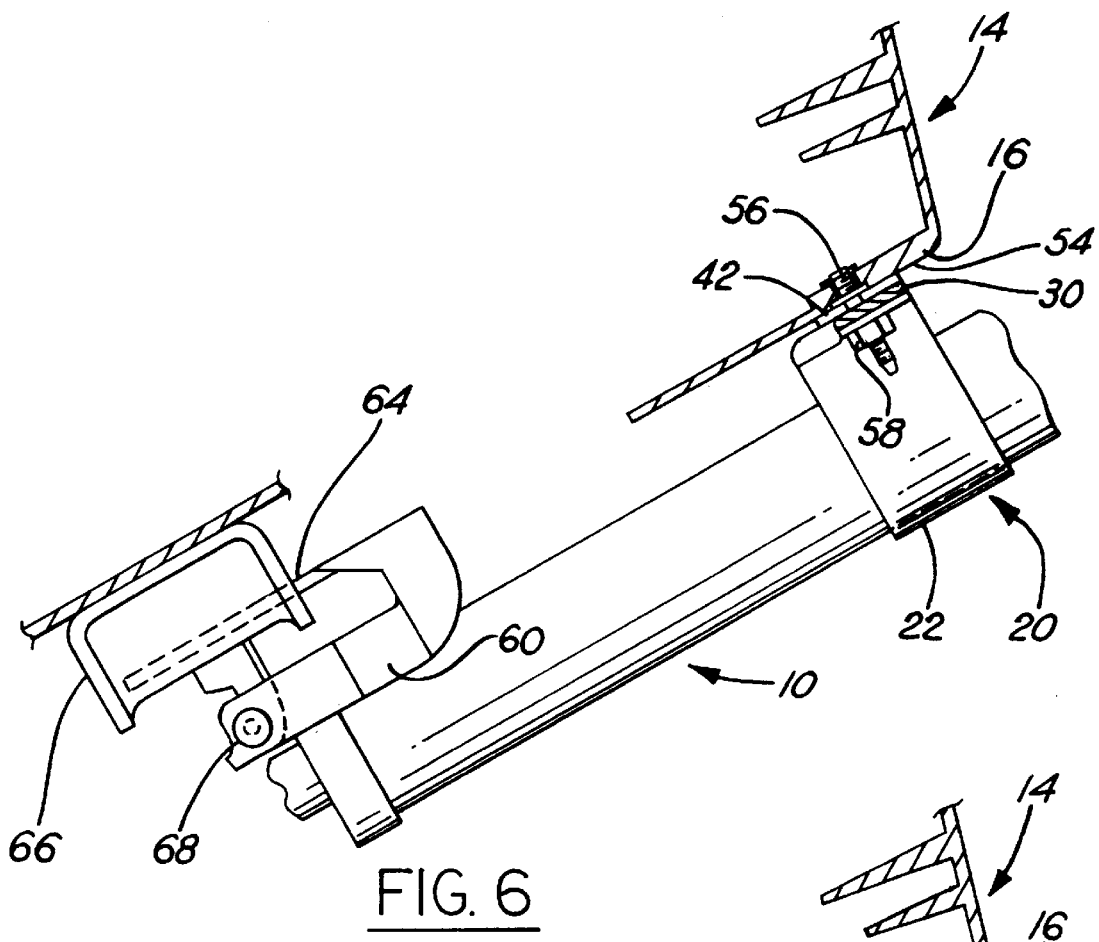

United States Patent [19]
Lewandowski et al.

[11] Patent Number: 5,819,592
[45] Date of Patent: Oct. 13, 1998

[54] STEERING COLUMN SUPPORT STRUCTURE

[75] Inventors: Mark Lewandowski, West Bloomfield; Laura Rosenbaum, Birmingham; Thomas F. Soltys, Metamora, all of Mich.

[73] Assignee: Chrysler Corporation, Auburn Hills, Mich.

[21] Appl. No.: 785,177

[22] Filed: Jan. 17, 1997

[51] Int. Cl.⁶ ..................................................... B62D 1/16
[52] U.S. Cl. ............................................ 74/492; 280/777
[58] Field of Search ........................... 74/492, 491, 495; 280/777, 779

[56] References Cited

U.S. PATENT DOCUMENTS

| | | | |
|---|---|---|---|
| 3,702,081 | 11/1972 | Arnston | 74/492 |
| 4,102,217 | 7/1978 | Yamamoto et al. | 74/492 |
| 4,884,778 | 12/1989 | Yamamoto | 248/548 |
| 5,127,670 | 7/1992 | Hoblingre et al. | 280/779 |
| 5,181,435 | 1/1993 | Khalifa et al. | 74/492 |
| 5,390,955 | 2/1995 | Kaliszewski et al. | 280/777 |
| 5,673,938 | 10/1997 | Kaliszewski | 280/777 |

OTHER PUBLICATIONS

Chrysler Corp. Production Engineering Drawing for Steering Column Operation "Assemble Shield to Cast Bracket", Install Studs to Steering Column Cast Bracket, Install Steering Column Support Bracket to Dash, and Install Steering Column to Vehicle, each drawing depicting a bracket made public as of Jun. 19, 1996.

*Primary Examiner*—Richard M. Lorence
*Assistant Examiner*—David M. Fenstermacher
*Attorney, Agent, or Firm*—Lawrence J. Shurupoff

[57] ABSTRACT

Apparatus for supporting a steering column of an automotive vehicle includes support structure have laterally spaced support flanges. A bracket on the steering column has bracket flanges. Insolator pads secured to the support flanges have a connection with the bracket flanges which releases in response to collapse of the steering column in a frontal impact. The support flanges have forward extensions providing ramps which engage the bracket flanges to prevent the steering column from rising during its collapse or during column stroke.

2 Claims, 3 Drawing Sheets

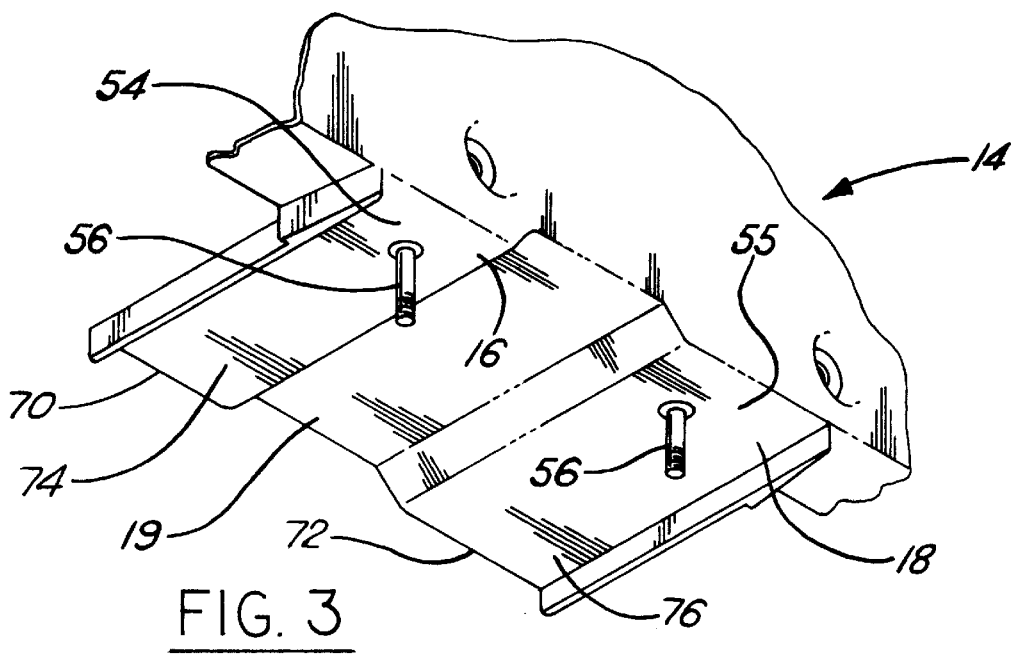
FIG. 3
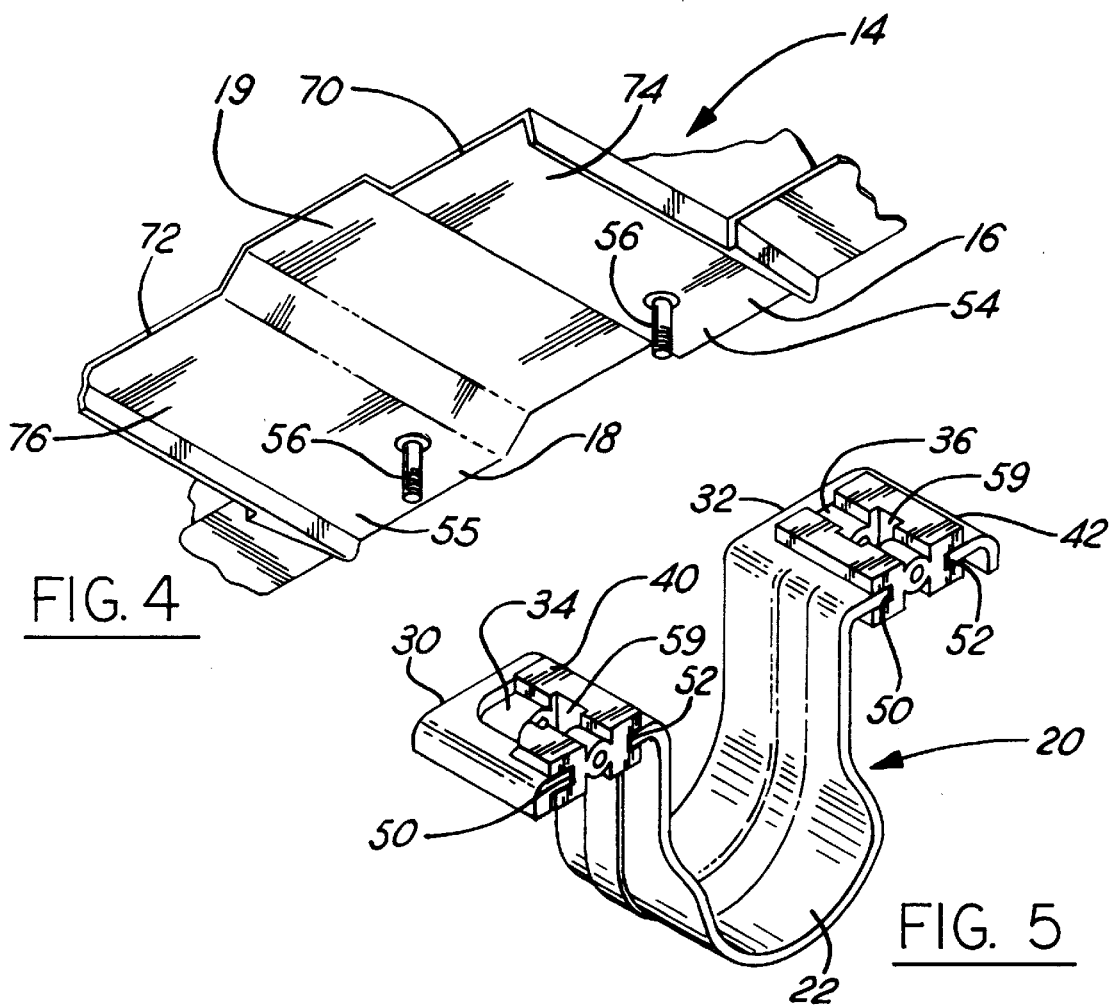
FIG. 4
FIG. 5

STEERING COLUMN SUPPORT STRUCTURE

FIELD OF THE INVENTION

This invention relates generally to steering columns for automotive vehicles and more particularly to apparatus for preventing the rise of the steering column when it collapses in response to a frontal impact.

BACKGROUND AND SUMMARY

When a vehicle is involved in a frontal impact, the force of the driver against the steering wheel will, if the impact is severe enough, cause a longitudinal collapse of the steering column. At the same time, the steering column tends to rise. In other words, the steering column which normally is inclined upwardly and rearwardly at a predetermined angle, will rise to a greater angle upon frontal impact. This is caused by the forward component of the driver force against the steering wheel in addition to vehicle crush.

The rise in the steering column places the steering wheel/airbag assembly in an unfavorable position with respect to the driver's chest. When the driver's chest comes in contact with the steering wheel/airbag assembly, the force against this assembly has a considerable off-axis bending component which is increased due to the rise in the steering column. If the rise in the steering column is such that the off-axis component of force on the steering wheel/airbag assembly acts above the center of mass of the driver's chest, then the driver tends to submarine or dive under the steering wheel, creating an even less favorable situation.

In accordance with the present invention, the collapse of the steering column upon frontal impact is controlled so that there is no appreciable upward rise or tilt. More particularly, support structure is provided on the vehicle frame preferably comprising support flanges which are opposed by flanges on a bracket carried by the steering column. Preferably, the support and bracket flanges are connected together by isolator pads. The isolator pads have a releasable or slidable connection with the bracket flanges to permit the bracket flanges, and hence the steering column, to collapse, that is, move longitudinally, in the event of a frontal impact. To prevent the steering column from rising, ramps are provided which follow the column angle, and extend forwardly of the flanges on the support structure and guide the steering column as it collapses. The structure manages the energy of the driver on the wheel which would otherwise initiate column rise.

One object of this invention is to provide apparatus for supporting a steering column and controlling its collapse in a frontal impact without permitting significant upward tilt of the steering column, having the foregoing features and capabilities.

Another object is to provide apparatus of the type described which is composed of a relatively few simple parts, is rugged and durable in use, and can be inexpensively manufactured and assembled, being particularly effective in preventing the rise of the steering column in the event that it collapses upon frontal impact.

These and other objects, features and advantages of the invention will become more apparent as the following description proceeds, especially when considered with the accompanying drawings.

BRIEF DESCRIPTION OF THE DRAWINGS

FIG. 1 is a perspective view showing a portion of a steering column supported by vehicle support structure, all constructed in accordance with the present invention.

FIG. 2 is an exploded perspective view of the structure shown in FIG. 1.

FIG. 3 is a perspective view of part of the vehicle support structure for the steering column.

FIG. 4 is a perspective view of the structure shown in FIG. 3, but seen from a different angle.

FIG. 5 is a detail perspective view, with parts broken away, showing the steering column bracket and associated insulator pads.

FIG. 6 is a fragmentary side elevational view, with parts broken away and in section, showing the steering column and support structure therefor.

FIG. 7 is a view similar to FIG. 6, but showing the relationship of the steering column to the support structure after collapse of the steering column following a frontal impact.

DETAILED DESCRIPTION OF THE PREFERRED EMBODIMENT

The elongated steering column 10 is shown in FIG. 1 at its normal orientation in which it extends longitudinally of the vehicle and is inclined upwardly and rearwardly, with a steering wheel 12 at its upper or rearward end.

To retain the steering column in the FIG. 1 position, support structure is provided including a support plate 14 which is rigidly secured to the frame of the vehicle. The support plate 14 has a pair of integral, laterally spaced-apart, parallel flanges 16 and 18 which are disposed on opposite sides of the steering column 10 and lie in a common plane above and parallel to the longitudinal axis of the steering column. A center section 19 of the plate 14 reinforces the plate and integrally connects the flanges 16 and 18.

A bracket 20 is provided for the steering column 10. The bracket 20 extends transversely of the steering column and has a generally U-shaped central portion 22 which loops under the steering column and is rigidly secured thereto as by welding. The upper ends of the central portion 22 are turned laterally outwardly to form integral, laterally spaced-apart, parallel bracket flanges 30 and 32. The bracket flanges are disposed on opposite sides of the steering column and lie in a common plane parallel to the plane of the support flanges 16 and 18. The bracket flanges 30 and 32 are opposed to and located directly beneath the support flanges 16 and 18. The bracket flanges 30 and 32 have longitudinally extending slots 34 and 36 which are open at the rear edges of the flanges and closed at the front edges thereof.

Isolator pads or capsules 40 and 42 are provided to dampen vibration. These isolator pads are made of any suitable sound and vibration dampening material and may be made of a suitable plastic such as nylon. The isolator pads or capsules are generally square and flat, having grooves 50 and 52 in the opposite side edges which receive the material of the bracket flanges 30 and 32 on opposite sides of the slots 34 and 36 therein. This is a frictional, slidable connection between the isolator pads 40, 42 and the bracket flanges 30, 32 for a purpose to be described.

The isolator pads are fastened to the coplanar flat bottom surfaces 54 and 55 of support flanges 16 and 18 by bolts 56 and nuts 58. The heads of the bolts are rigidly secured to the support flanges 16 and 18 and the shanks of the bolts extend downwardly through holes 59 in the center of the isolator pads. The nuts 58 are threaded on the lower ends of the bolt shanks to securely fasten the isolator pads to the support flanges 16 and 18.

The support structure for the steering column 10 also includes a strap 60 on one side of the steering column and a similar strap (not shown) on the opposite side. These straps have one end integrally connected to a plate 64 that is rigidly secured to a channel portion 66 of the vehicle frame. The opposite end of each strap is connected to the steering column at 68. The straps extend generally longitudinally of the steering column and are sufficiently flexible to yield when the steering column collapses longitudinally. The straps aid in the support of the steering column during normal operating conditions, but are designed to bend and permit the collapse of the steering column in a frontal impact. The straps are connected to the steering column at a point spaced forwardly of the bracket 20.

It was stated previously that the connection between the isolator pads 40 and 42 and the bracket flanges 30 and 32 is a slidable connection, and this is for the purpose of permitting the bracket 20 and hence the steering column 10 to move or collapse longitudinally in a forward direction upon frontal impact, with the isolator pads remaining attached to the support flanges 18 and 20 and sliding out of the slots 34 and 36 as the bracket flanges move forward.

Also, as previously mentioned, there is a tendency for the steering column to tilt up as it collapses, and to prevent this from occurring, the support plate 14 has a pair of ramps 70 and 72 which extend forwardly from and in the same plane as the support flanges 16 and 18 in the general direction of length of the steering column. The flat bottom surfaces 74 and 76 of the ramps 70 and 72 extend in continuation of the flat bottom surfaces 54 and 55 of the support flanges 16 and 18 as seen in FIGS. 3, 4, 6 and 7 so that these ramp surfaces lie in the same plane as the bottom surfaces of the support flanges and provide a guide for the steering column as it collapses.

Figure 7:
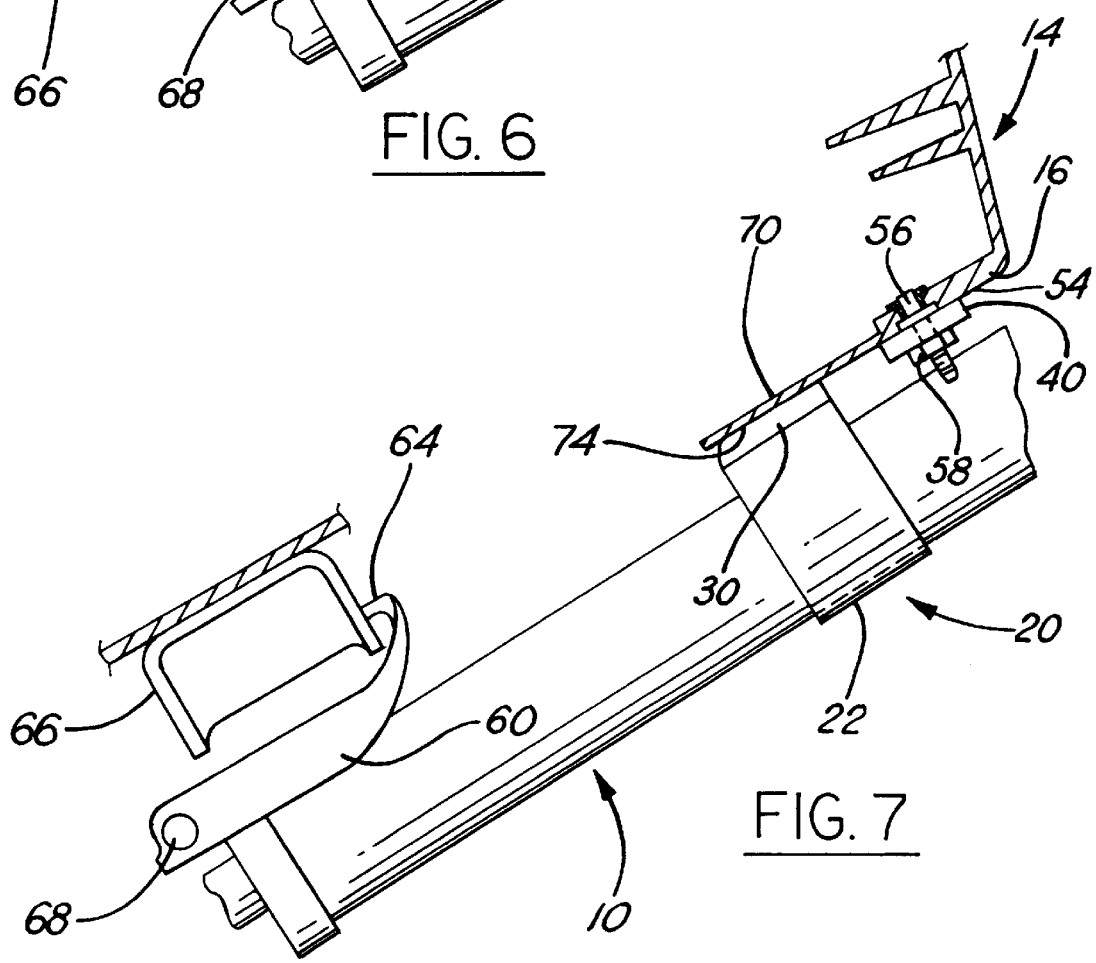

As shown in FIG. 7, after the initial collapse of the steering column and separation of the bracket flanges 30 and 32 from the isolator pads 40 and 42, the bracket flanges are guided by these ramp surfaces 74 and 76 and thus the steering column 10 is prevented from tilting upwardly. While there may be some slight fractional upward movement, depending on the thickness of the isolator pads, this is so minimal that for all intents and purposes, there is virtually no upward tilt of the steering column as it collapses due to the sliding engagement of the bracket flanges 30 and 32 with the ramp surfaces 74 and 76. The ramps and hence the ramp surfaces are long enough to provide a barrier to upward tilt throughout the full stroke of the steering column as it collapses. The length of the extended ramp surfaces may, for example, be as much as 4 inches to provide control over the entire steering column stroke.

Thus, the ramps 70 and 72 constitute a cantilevered forward surface of the support flanges 16 and 18 and during a vehicle crash, as the steering column is released from its capsules, the bracket flanges ride along these ramp surfaces. The end result is a "no-rise" steering column design that allows the steering column to stroke or collapse during vehicle impact without any rise or upward tilt.

What is claimed is:

1. Apparatus for supporting an elongated steering column of an automotive vehicle comprising a vehicle frame, support structure secured to the vehicle frame having laterally spaced, first and second support flanges, a bracket secured to the steering column having laterally spaced, first and second bracket flanges extending laterally outwardly from opposite sides of said steering column beneath and opposed to said respective support flanges, means connecting said first bracket flange to said first support flange and said second bracket flange to said second support flange, said connecting means comprising a first isolator pad secured to said first support flange and a second isolator pad secured to said second support flange, said first and second isolator pads frictionally engaging said first and second bracket flanges to provide support for the steering column but being releaseable in response to forward movement of said bracket flanges and steering column in the event of a longitudinal forward collapse of the steering column in a frontal impact, and ramp means for guiding the forward collapse of the steering column in a frontal impact without permitting significant upward tilt of the steering column, said ramp means comprising ramps integral with and extending forwardly of said respective support flanges, and said bracket flanges being adapted to slide on said ramps to guide the forward collapse of the steering column.

2. Apparatus as defined in claim 1, wherein said support flanges have coplanar support surfaces to which said respective isolator pads are secured, and said ramps have ramp surfaces slidably contacted by said bracket flanges during the collapse of the steering column, said ramp surfaces being coplanar continuations of said support surfaces of said support flanges.

* * * * *